United States Patent
Fukasawa

(10) Patent No.: US 8,514,419 B2
(45) Date of Patent: Aug. 20, 2013

(54) IMAGE PROCESSING APPARATUS WITH CONSUMABLES RESTRICTION FUNCTION

(75) Inventor: Ryuji Fukasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1288 days.

(21) Appl. No.: 11/896,379

(22) Filed: Aug. 31, 2007

(65) Prior Publication Data
US 2008/0055648 A1 Mar. 6, 2008

(30) Foreign Application Priority Data

Sep. 1, 2006 (JP) ................................. 2006-237519

(51) Int. Cl.
*G06K 15/00* (2006.01)
*G06F 3/12* (2006.01)
*G03G 21/02* (2006.01)
*G03G 15/00* (2006.01)

(52) U.S. Cl.
USPC .............. 358/1.14; 358/1.15; 399/79; 399/80

(58) Field of Classification Search
USPC ............................. 358/1.14, 1.15; 399/79, 80
See application file for complete search history.

(56) References Cited

U.S. PATENT DOCUMENTS

| 2002/0080382 A1* | 6/2002 | Ohtsu | 358/1.14 |
| 2003/0202199 A1* | 10/2003 | Carter et al. | 358/1.13 |
| 2006/0001900 A1* | 1/2006 | Watanabe et al. | 358/1.14 |
| 2007/0103712 A1* | 5/2007 | Corona | 358/1.14 |

FOREIGN PATENT DOCUMENTS
JP 05-089362 4/1993

OTHER PUBLICATIONS

York University Libraries, "Library Newsletter for York U Faculty, Fall 2005", Published Fall 2005, http://www.library.yorku.ca/FacultyNews/Fall05/Sections/LibServ/PrintScanCopy.htm.*

* cited by examiner

*Primary Examiner* — Twyler Haskins
*Assistant Examiner* — Fred Guillermety
(74) *Attorney, Agent, or Firm* — Rabin & Berdo, P.C.

(57) ABSTRACT

A multifunction printer provided with an image scanning process unit and a facsimile sending process unit for executing an image process that does not use consumables, an image forming process unit for executing an image process that uses consumables, a consumables usage judgment unit for making a judgment as to whether a requested image process is a process that uses consumables, and a process control unit for restricting performance of the image process by the image forming process unit and permitting performance of the image process by the image scanning process unit or the facsimile sending process unit based on a judgment result of the consumables usage judgment unit.

4 Claims, 10 Drawing Sheets

FIG. 9

| PRINTER NAME | USER ID | PASSWORD |
|---|---|---|
| PRINTER A | abc0000 | NONE |
| | abc0002 | 1234 |
| PRINTER B | abc0001 | 5678 |
| PRINTER C | | |
| | abc0002 | 2345 |

IMAGE PROCESSING APPARATUS WITH CONSUMABLES RESTRICTION FUNCTION

BACKGROUND OF THE INVENTION

1. Field of the Invention

The present invention relates to an image processing apparatus equipped having image processing functions.

2. Description of Related Art

To execute image formation in an image forming apparatus that forms an image on a recording medium, the recording medium such as paper and a recording material such as toner or ink are necessary, but the used recording medium and recording material are consumables, thereby incurring a running cost. Therefore, to cover the incurred running costs, an apparatus is proposed having a billing function for collecting money from a user using the image forming apparatus (see, e.g., Patent Document 1: Published Unexamined Patent Application No. hei5(1993)-89362). Furthermore, it is proposed that technology be used in such an apparatus, such that users can be limited a number of times each user can use a certain apparatus can also be limited by specifying the user.

In recent years, multifunction printers having various functions, such as a facsimile function to send scanned text, a scanning function for scanning text, a copy function for copying scanned text, or the like in addition to a printing function of a printer, have been spreading. In such a multifunction printer, however, in a case where sending of the text by the facsimile function or scanning of the text by the scanning function is executed, regardless of whether or not consumables such as the recording medium or the recording material are used, the user that does not have permission to use consumables is not only unable to use the functions that use consumables, but is unable to use all of the functions, including functions that do not use consumables, so that there is a problem of inconvenience for the user.

SUMMARY OF THE INVENTION

It is an objective of the present invention, taking the above situation into consideration, to provide an image processing apparatus that can improve convenience of the user by not unnecessarily limiting the use of functions that do not use consumables.

To achieve the aforementioned objective, the image processing apparatus of the present invention is an image processing apparatus provided with multiple image processing functions and contains a first image processing unit for executing an image process that does not use consumables, a second image processing unit for executing an image process that uses the consumables, a consumables usage judgment unit for making a judgment as to whether a requested image process is a process that uses the consumables or a process that does not use the consumables, and an image process restriction unit for restricting performance of the image process by the second image processing unit based on a judgment result of the consumables usage judgment unit.

In such an image processing apparatus according to the present invention, a judgment is made as to whether the requested image process is a process that uses consumables, and in a case where the requested process is a process that uses consumables, performance of the process is restricted, so that usage of a function that does not use consumables is not unnecessarily restricted.

In the present invention, a decrease in convenience of use for the user can be prevented without unnecessarily restricting usage of a function that does not use consumables, and furthermore, a user who is not permitted to use consumables can be reliably prevented from performing an image process that uses consumables.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein:

FIG. 9 is a diagram describing a specific example of transfer approval information stored in a transfer approval information storage unit in the multifunction printer shown as a fourth embodiment of the present invention.

PREFERRED EMBODIMENTS

The following is a detailed description, referencing diagrams, of specific embodiments of the present invention.

[First Embodiment]

The present embodiment is an image processing apparatus provided with multiple image processing functions. Particularly, the image processing apparatus makes a judgment as to whether a requested image process is a process that uses consumables or a process that does not use consumables, and in a case where the image process does not use consumables, gives permission to perform the image process without restriction.

First, a multifunction printer, serving as an image processing apparatus shown in a first embodiment of the present invention, is described. The description concerns the multifunction printer provided with the printing function and the copy function as functions performing an image process that uses consumables and provided with the scanner function and the facsimile function as functions performing an image process that does not use consumables.

Figure 1:
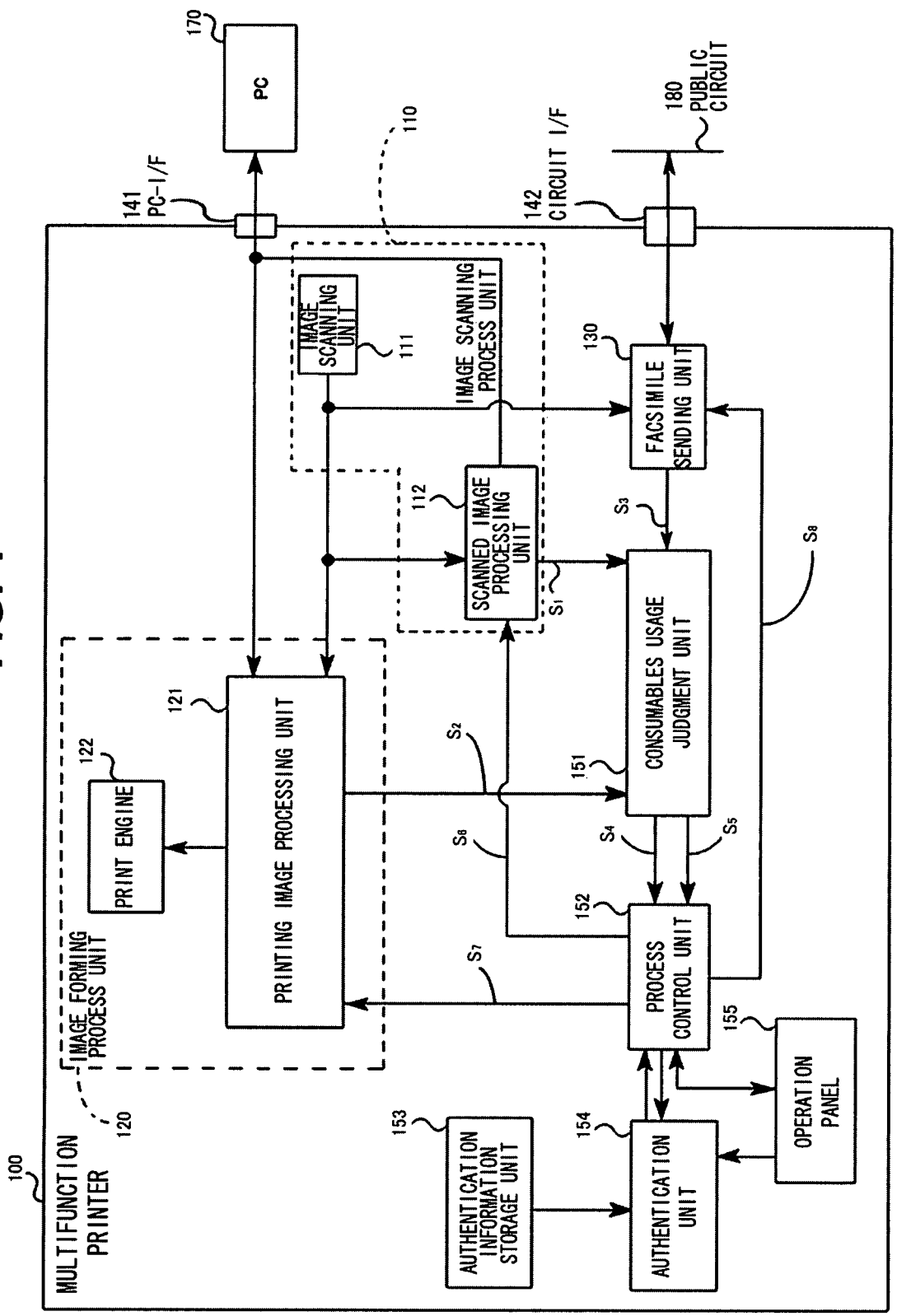
FIG. 1 is a block diagram describing a structure of a multifunction printer shown as a first embodiment of the present invention.

As shown in FIG. 1, a multifunction printer 100 is provided with three image processing units, namely an image scanning process unit 110 for executing a process to scan the image, an image forming process unit 120 for executing a process to form the image, and a facsimile sending process unit 130 for executing a process to send a facsimile of the image.

The image scanning process unit 110 includes an image scanning unit 111 for scanning a manuscript image and a scanned image processing unit 112 for applying image processing used for scanning to image data read by the image scanning unit 111.

The image scanning unit 111 scans the manuscript image and, according to content of the requested image process, the scanned image processing unit 112 provides the acquired image data to a printing image processing unit 121, described below, of the image forming process unit 120 and the facsimile sending process unit 130.

Upon receiving a request for the scanning process through operation of an operation panel 155, described below, the scanned image processing unit 112 supplies a scanning process initiation request signal S1 requesting initiation of the scanning process to a consumables usage judgment unit 151, described below. Furthermore, the scanned image processing unit 112, under control of a process control unit 152, described below, generates image data, which is the image data supplied from the image scanning unit 111 to which a prescribed image process is applied (hereinafter referred to as "scanned data"). This scanned data is then output by the scanned image processing unit 112 to a personal computer (PC) 170, serving as a host apparatus, via a primary interface unit (PC-I/F) 141 conforming to, for example, a USB (Universal Serial Bus), IEEE (the Institute of Electrical and Electronic Engineers) 1394 code, or the like. Upon receiving the scanned data, the personal computer 170 shows a prescribed display and stores the scanned data in a storage medium such as a hard disk or the like housed therein.

Such an image scanning process unit 110 applies the prescribed image process to image information scanned and acquired from the manuscript image and outputs the generated image data to the personal computer 170. In other words, the image scanning process unit 110 performs the image scanning process as an image process that does not use consumables.

The image forming process unit 120 contains the printing image processing unit 121 for applying the image process for printing to the data sent from the personal computer 170 and to the image data scanned by the image scanning unit 111, and also contains a print engine 122 for executing printing based on printing data acquired by the printing image processing unit 121.

Upon receiving the data sent from the personal computer 170 via the primary interface unit 141, or upon receiving the request for a copying process through operation of the operation panel 155, the printing image processing unit 121 supplies a printing process initiation request signal $S_2$ requesting initiation of the printing process to the consumables usage judgment unit 151. Furthermore, even in a case where the printing image processing unit 121 receives the image data supplied from the image scanning unit 111, the printing process initiation request signal $S_2$ is supplied the consumables usage judgment unit 151. The printing image processing unit 121, under the control of the process control unit 152, applies the prescribed image process to the data sent from the personal computer 170 or the image data supplied from the image scanning unit 111 to generate the printing data, and this printing data is then supplied to the print engine 122. It goes without saying that the printing process of the image data supplied from the image scanning unit 111 refers to the copying process of copying the manuscript scanned by the image scanning process unit 110.

The print engine 122 uses the recording material, such as toner or ink, to execute printing on the recording medium, such as paper, based on the printing data supplied from the printing image processing unit 121. For example, in a case where the printing process is executed having an electrophotographic format, the print engine 122 is structured as a printing unit that forms printed material by executing image formation by transferring charged toner to the recording medium and then thermally fusing the formed toner image onto the recording medium. Furthermore, in a case where the printing process is executed having an ink jet format, the print engine 122 is structured as a printing unit that forms printed material by discharging ink drops onto the recording medium.

Such an image forming process unit 120 applies the prescribed image process to the input image data and executes printing on the recording medium based on the printing data. That is, the image forming process unit 120 performs the printing process or the copying process of the image as an image process that uses toner and the recording medium as consumables.

Upon receiving the request for the facsimile sending process through operation of the operation panel 155, the facsimile sending process unit 130 supplies a facsimile sending process initiation request signal $S_3$ requesting initiation of the facsimile sending process to the consumables usage judgment unit 151. Furthermore, the facsimile sending process unit 130, under control of the process control unit 152, generates facsimile data, which is the image data supplied from the image scanning unit 11 to which a prescribed image process is applied. This facsimile data is then output by the facsimile sending process unit 130 to a public circuit 180 via a secondary interface unit (circuit I/F) 142 and sent to a facsimile machine of the recipient. That is, the facsimile sending process unit 130 performs the facsimile sending process of the image as an image process that does not use consumables.

In the manner described above, by providing the multifunction printer 100 with the image scanning process unit 110, the image forming process unit 120, and the facsimile sending process unit 130, the multifunction printer 100 can perform the printing process and the copying process as image processes that use consumables and can perform the scanning process and the facsimile process as image processes that don't use consumables.

In addition, the multifunction printer 100 is provided with the consumables usage judgment unit 151 for making a judgment as to whether the requested image process is a process that uses consumables or a process that does not use consumables, the process control unit 152 for executing overall control of processes of the multifunction printer 100, an authentication information storage unit 153 for storing authentication information, an authentication unit 154 for executing authentication of the user, and the operation panel 155 operated by the user.

The consumables usage judgment unit 151 makes a judgment as to whether the requested process is a process that uses consumables, based on the process initiation request signals $S_1$, $S_2$, and $S_3$ supplied from the image scanning process unit 110, the image forming process unit 120, and the facsimile sending process unit 130, respectively. That is, in a case where the scanning process initiation request signal $S_1$ is received from the scanned image processing unit 112 of the image scanning process unit 110, the consumables usage judgment unit 151 makes a judgment that the requested image process is the image scanning process, which does not use consumables. Furthermore, in a case where the printing process initiation request signal $S_2$ is received from the printing image processing unit 121 of the image forming process unit 120, the consumables usage judgment unit 151 makes a judgment that the requested image process is the printing process or the copying process, which uses consumables. Yet further, in a case where the facsimile sending process initiation request signal $S_3$ is received from the facsimile sending process unit 130, the consumables usage judgment unit 151 makes a judgment that the requested image process is the image facsimile sending process, which does not use consumables. The consumables usage judgment unit 151 then supplies to the process control unit 152 a judgment result signal $S_4$ concerning whether consumables are used and a process type signal $S_5$ showing the type of image process requested.

In a case where the process control unit 152 makes a judgment that the requested image process is a process that does not use consumables based on the judgment result signal $S_4$ and the process type signal $S_5$ supplied from the consumables usage judgment unit 151, or a case where permission is received to use consumables, permission signals $S_6$, $S_7$, $S_8$ permitting performance of the image process are supplied to the corresponding process units. That is, in a case where the process control unit 152 makes a judgment that the requested image process is the scanning process, which is a process that does not use consumables, based on the judgment result signal $S_4$ and the process type signal $S_5$ supplied from the consumables usage judgment unit 151, a scanning process permission signal $S_6$ permitting performance of the scanning process is supplied to the scanned image process unit 112 of the image scanning unit 110. Furthermore, in a case where the process control unit 152 makes a judgment that the requested image process is the facsimile sending process, which is a process that does not use consumables, based on the judgment result signal $S_4$ and the process type signal $S_5$ supplied from the consumables usage judgment unit 151, a facsimile sending process permission signal $S_8$ permitting performance of the facsimile sending process is supplied to the facsimile sending process unit 130. On the other hand, in a case where the process control unit 152 makes a judgment that the requested image process is a process that uses consumables, based on the judgment result signal $S_4$ and the process type signal $S_5$ supplied from the consumables usage judgment unit 151, a user authentication process is executed by the authentication unit 154. In a case where a result of the authentication by the authentication unit 154 is that the user is permitted to use consumables, the process control unit 152 supplies a permission signal $S_7$ permitting performance of the image process to the corresponding process unit. That is, in a case where the process control unit 152 makes a judgment that the requested image process is the image printing process or copying process, which are processes that use consumables, based on the judgment result signal $S_4$ and the process type signal $S_5$ supplied from the consumables usage judgment unit 151, the user authentication process is executed by the authentication unit 154. In a case where the result of the authentication by the authentication unit 154 is that the user is permitted to use consumables, the process control unit 152 supplies a printing process permission signal $S_7$ permitting performance of the printing process or the copying process to the printing image processing unit 121 of the image forming process unit 120. On the other hand, in a case where the result of the authentication by the authentication unit 154 is that the user is not permitted to use consumables, the process control unit 152 the printing process permission signal $S_7$ is not supplied to the printing image processing unit 121, so that the printing process and the copying process cannot be performed.

The authentication information storage unit 153 stores the authentication information which is necessary for the authentication unit 154 to execute the authentication process. Specifically, the authentication information storage unit 153 stores a user ID and associated password uniquely assigned to each user as the authentication information. The authentication information is stored in the authentication information storage unit 153 by maintenance personnel of the multifunction printer 100 performing an operation via the operation panel 155. The authentication information stored in the authentication information storage unit 153 is read by the authentication unit 154.

The authentication unit 154 makes a judgment as to whether the authentication information read from the authentication information storage unit 153 is identical to the authentication information input via the operation panel 155 based on an authentication initiation signal supplied from the process control unit 152, and supplies an authentication result signal to the process control unit 152.

The operation panel 155 is disposed on a portion of a chassis of the multifunction printer 100 in a manner to be operable by the user. Via the operation panel 155, the user can execute various operations, such as an operation to request performance of a desired process, various setting operations, an operation to input authentication information, and the like, and can also browse messages showing a condition of the multifunction printer 100.

Figure 2:
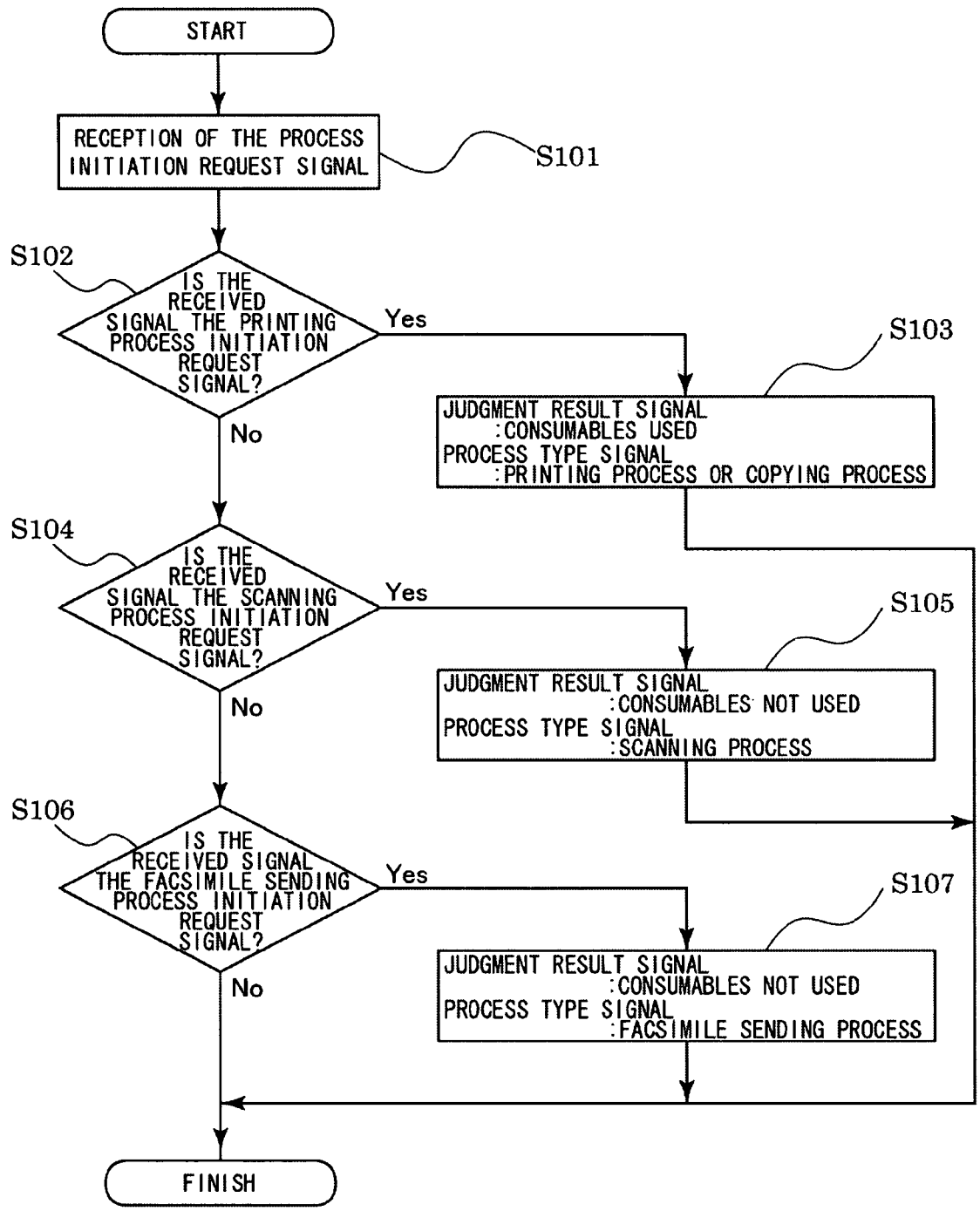
FIG. 2 is a flow chart describing a series of processes at a time when a judgment is made as to whether a requested image process is a process that uses consumables in the multifunction printer shown as the first embodiment of the present invention.

In the multifunction printer 100 provided with each of the aforementioned units, the consumables usage unit 151 makes a judgment as to whether the requested image process is a process that uses consumables in accordance with a series of procedures shown in FIG. 2, for example.

First, as shown in FIG. 2 at step S101, the consumables usage judgment unit 151 receives any one of the process initiation request signals $S_1$, $S_2$, $S_3$ from one of the image scanning process unit 110, the image forming process unit 120, or the facsimile sending process unit 130 in response to the user executing a performance request operation for one of the image copying process, scanning process, or facsimile sending process via the operation panel 155, or in response to receiving a printing initiation command or data sent from the personal computer 170. The process initiation request signal $S_1$ is a signal requesting initiation of the image scanning process, and the permission signal corresponding to this request is the scanning process permission signal $S_6$. The process initiation request signal $S_2$ is a signal requesting initiation of the printing process or copying process, and the permission signal corresponding to this request is the printing process permission signal $S_7$. The process initiation request signal $S_3$ is a signal requesting initiation of the facsimile sending process, and the permission signal corresponding to this request is the facsimile sending process permission signal $S_8$.

At step S102, the consumables usage judgment unit 151 makes a judgment as to whether the received process initiation request signal is the printing process initiation request signal $S_2$. In a case where the received process initiation request signal is the printing process initiation request signal $S_2$, the consumables usage judgment unit 151 makes a judgment that the requested image process is the printing process or the copying process and then, at step S103, supplies to the process control unit 152 the judgment result signal $S_4$, which includes the information that consumables are used, and the process type signal $S_5$, which shows that the requested image process is the printing process or the copying process. The series of processes is then finished.

At step S102, in a case where the received process initiation request signal is not the printing process initiation request signal $S_2$, the consumables usage unit 151, at step S104, makes a judgment as to whether the received process initiation request signal is the scanning process initiation request signal $S_1$. In a case where the received process initiation request signal is the scanning process initiation request signal $S_1$, the consumables usage judgment unit 151 makes a judgment that the requested image process is the scanning process and then, at step S105, supplies to the process control unit 152 the judgment result signal $S_4$, which includes the information that consumables are not used, and the process type signal $S_5$, which shows that the requested image process is the scanning process. The series of processes is then finished.

At step S104, in a case where the received process initiation request signal is not the scanning process initiation request signal $S_1$, the consumables usage judgment unit 151, at step S106, makes a judgment as to whether the received process initiation request signal is the facsimile sending process initiation request signal $S_3$. In a case where the received process initiation request signal is the facsimile sending process initiation request signal $S_3$, the consumables usage judgment unit 151 makes a judgment that the requested image process is the facsimile sending process and then, at step S107, supplies to the process control unit 152 the judgment result signal $S_4$, which includes the information that consumables are not used, and the process type signal $S_5$, which shows that the requested image process is the facsimile sending process. The series of processes is then finished.

According to such a series of procedures, the consumables usage judgment unit 151 can make a judgment as to whether the requested image process is a process that uses consumables.

Figure 3:
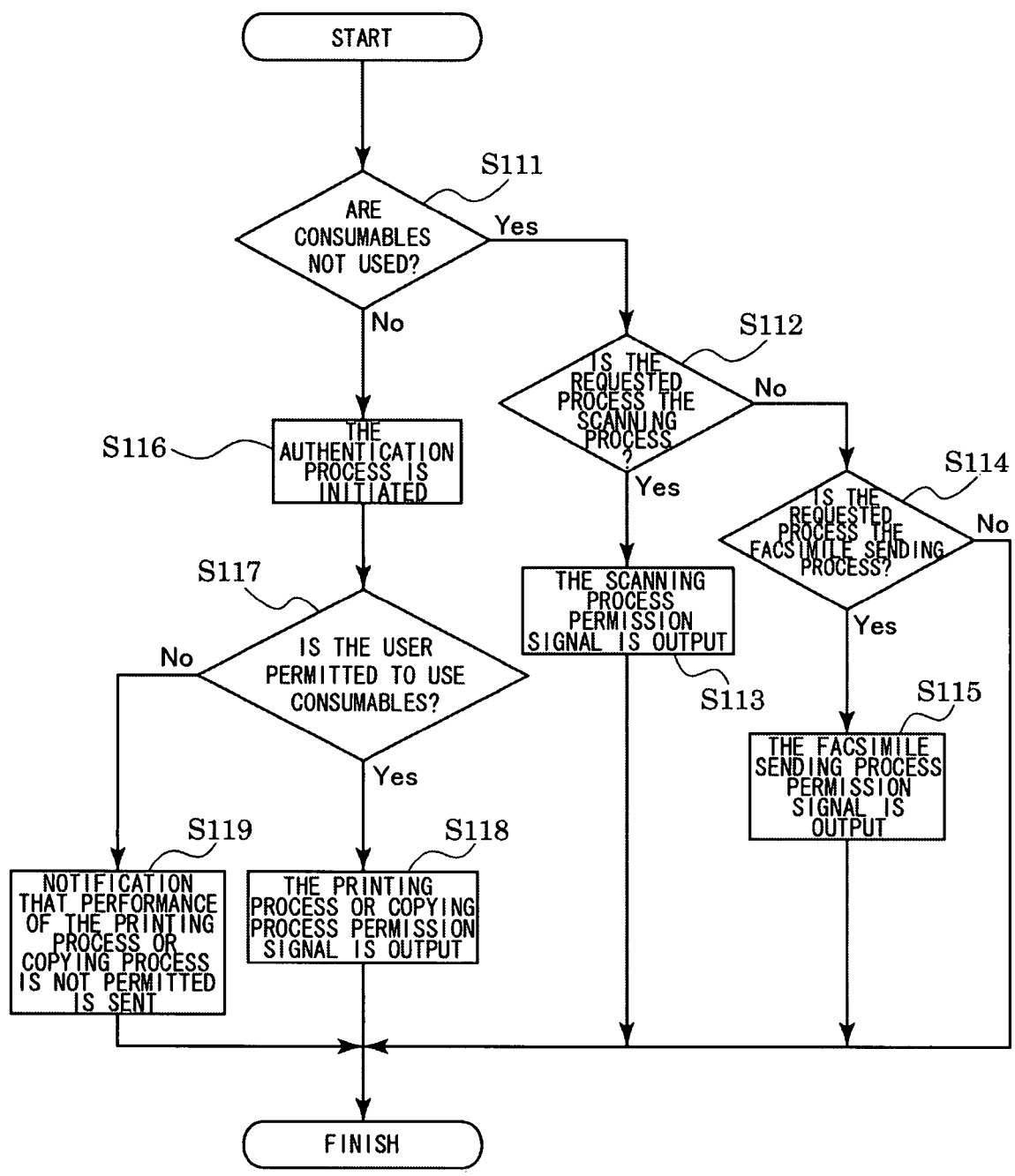
FIG. 3 is a flow chart describing a series of processes at a time when performance of each process is controlled in the multifunction printer shown as the first embodiment of the present invention.

In the multifunction printer 100, the performance of each process is controlled by the process control unit 152 in response to the judgment process of the consumables usage judgment unit 151, in accordance with a series of procedures shown in FIG. 3, for example.

That is, as shown in FIG. 3 at step S111, the process control unit 152 makes a judgment as to whether the requested image process is a process that does not use consumables based on the judgment result signal $S_4$ supplied from the consumables usage judgment unit 151.

In a case where a judgment is made that the requested image process is a process that does not use consumables, the process control unit 152, at step S112, makes a judgment as to whether the requested image process is the scanning process based on the process type signal $S_5$ supplied from the consumables usage judgment unit 151. In a case where a judgment is made that the requested image process is the scanning process, the process control unit 152, at step S113, supplies the scanning process permission signal $S_6$ permitting performance of the scanning process to the scanned image process unit 112 of the image scanning process unit 110. The series of processes is then finished. In response to the aforementioned process, the image scanning process unit 110 performs the scanning process of the image and outputs the scanned data to the personal computer 170.

In a case where a judgment is made at step S112 that the requested image process is not the scanning process, the process control unit 152, at step S114, makes a judgment as to whether the requested image process is the facsimile sending process based on the process type signal $S_5$ supplied from the consumables usage judgment unit 151. In a case where a judgment is made that the requested image process is the facsimile sending process, the process control unit 152, at step S115, supplies the facsimile sending process permission signal $S_8$ permitting performance of the facsimile sending process to the facsimile sending process unit 130. The series of processes is then finished. In response to the aforementioned process, the facsimile sending process unit 130 performs the facsimile sending process of the image, outputs the facsimile data to the public circuit 180 via the secondary interface unit (circuit I/F) 142, and sends the facsimile data to the facsimile machine of the recipient.

On the other hand, in a case where the process control unit 152 makes a judgment at step S111 that the requested process is a process that uses consumables, the process moves to step S116 and the user authentication process is executed by supplying the authentication initiation signal to the authentication unit 154. At this time, the process control unit 152 sends a notification message to the user via the operation panel 155 prompting the user to input the authentication information. In a case where the process control unit 152 makes a judgment at step S117 that the user is permitted to use consumables based on the authentication result signal supplied from the authentication unit 154, the process unit 152 then, at step S118, supplies the printing process permission signal $S_7$ permitting performance of the printing process or the copying process to the printing image processing unit 121 of the image forming process unit 120. The series of processes is then finished. In response to the aforementioned process, the image forming process unit 120 performs the printing process or copying process of the image, thereby creating the printed material. In a case where the process control unit 152 makes a judgment at step S117 that the user is not permitted to use consumables based on the authentication result signal supplied from the authentication unit 154, the process unit 152 then, at step S119, sends a notification message via the operation panel 155 stating that the user is not permitted to perform the printing process or copying process, and does not supply the printing process permission signal $S_7$ to the image forming process unit 120. The series of processes is then finished.

In the multifunction printer 100, the process control unit 152 can control the performance of each process, based on the judgment as to whether to perform the requested process, according to the aforementioned series of procedures.

As described above, in the multifunction printer 100 shown as the first embodiment of the present invention, a judgment is made as to whether the requested image process is a process that uses consumables. In a case where the requested process uses consumables, performance of the image process is restricted. In a case where the requested process does not use consumables, performance of the image process is permitted without restriction. Therefore, a decrease in convenience of use for the user can be prevented. Furthermore, in the multifunction printer 100, a user who is not permitted to use consumables can be reliably restricted from performing the image process that uses consumables.

[Second Embodiment]

Next, a multifunction scanner, serving as an image processing apparatus shown in a second embodiment of the present invention, is described.

The multifunction scanner shown as the second embodiment is not provided with a function to perform the printing process and the copying process as in the multifunction printer of the first embodiment, but is provided with a function to send printing data to an external printer, so that the same process as those of the first embodiment can be executed. Accordingly, in the description of the second embodiment, components that are the same as those described in the first embodiment are given the same number and the detailed description is omitted. The following description concerns a multifunction scanner provided with a printing data sending function as a function for performing an image process that uses consumables, and also provided with a scanner function and facsimiles function as functions for performing an image process that does not use consumables.

Figure 4:
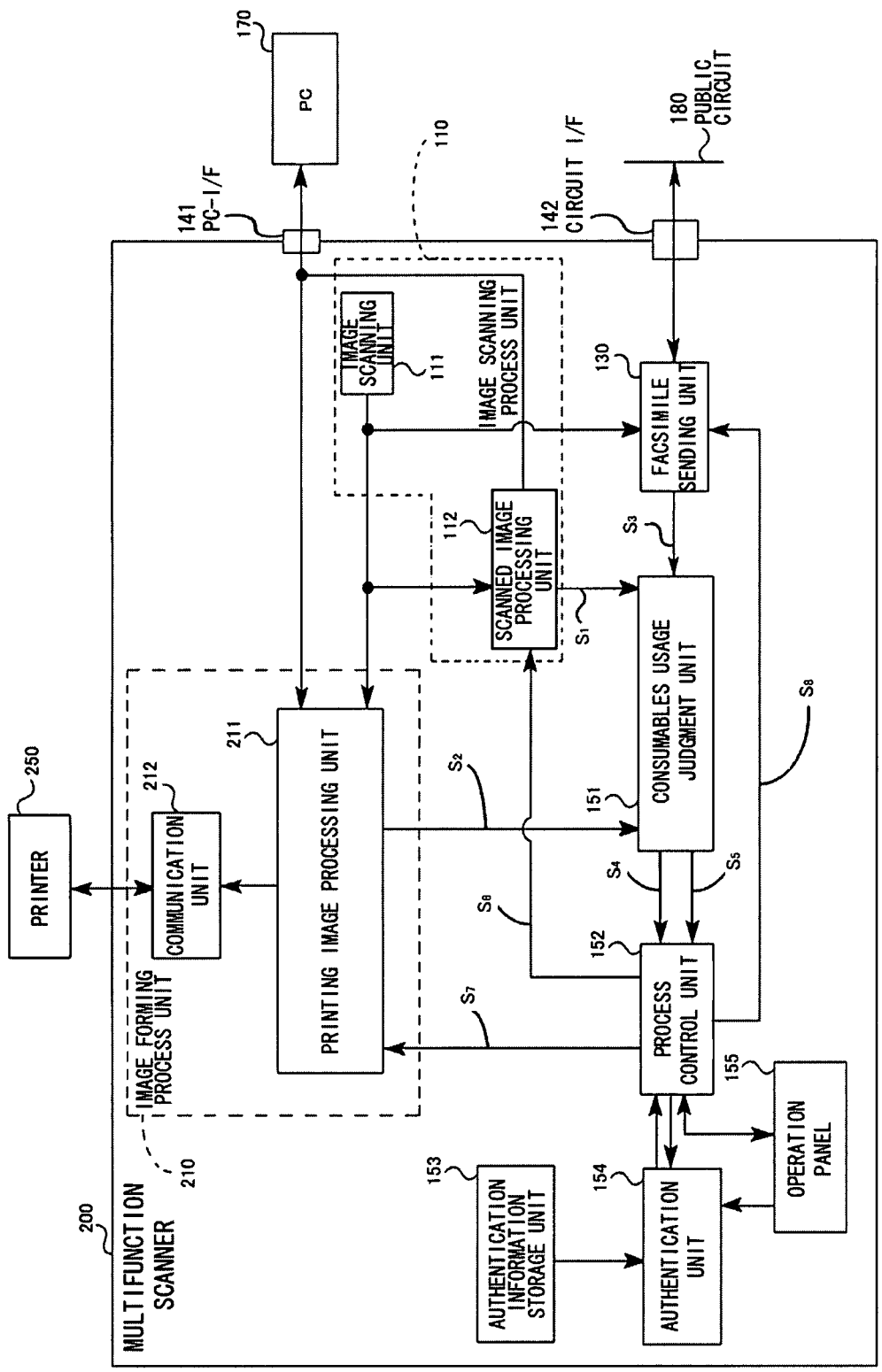
FIG. 4 is a block diagram describing a structure of a multifunction scanner shown as a second embodiment of the present invention.

As shown in FIG. 4, the multifunction scanner 200 is provided with the aforementioned consumables usage judgment unit 151, the process control unit 152, the authentication information storage unit 153, the authentication unit 154, and the operation panel 155. The multifunction scanner 200 is further provided with three image processing units, namely the aforementioned image scanning process unit 110, the facsimile sending process unit 130, and a image forming process unit 210 for executing the image forming process.

The image forming process unit 210 includes a printing image processing unit 211 for applying an image process used for printing to the image data scanned by the image scanning unit 111 or to the data sent from the personal computer 170, and a communication unit 212 for sending the printing data acquired by the printing image processing unit 211 to an external printer 250.

In the same manner as the aforementioned printing image processing unit 121, upon receiving the data sent from the personal computer 170 via the primary interface unit 141, the printing image processing unit 211 supplies a printing process initiation request signal $S_2$ requesting initiation of the printing process to the consumables usage judgment unit 151. Furthermore, even in a case where the printing image processing unit 211 receives the image data supplied from the image scanning unit 111, the printing process initiation request signal $S_2$ is supplied the consumables usage judgment unit 151. The printing image processing unit 211, under the control of the process control unit 152, applies the prescribed image process to the data sent from the personal computer 170 or the image data supplied from the image scanning unit 111 to generate the printing data, and this printing data is then supplied to the print engine 122.

The communication unit 212 transfers the printing data supplied from the printing image processing unit 211 to the printer 250 serving as an external image forming apparatus.

The image forming process unit 210 applies the prescribed image process to the input image data and sends the generated printing data to the printer 250. In addition, the printer 250 is structured as an apparatus that uses the recording material, such as toner or ink, to execute printing on the recording medium, such as paper, based on the printing data. For example, in a case where the printing process is executed having an electrophotographic format, the printer 250 is structured as an apparatus that forms printed material by executing image formation by transferring charged toner to the recording medium and then thermally fusing the formed toner image onto the recording medium. Furthermore, in a case where the printing process is executed having an ink jet format, the printer 250 is structured as an apparatus that forms printed material by discharging ink drops onto the recording medium. Accordingly, by executing the printing process or the copying process of the image using the printer 250, the image forming process unit 210 can perform the printing data sending process as an image process that uses consumables.

In the multifunction scanner 200 provided with each of the aforementioned units, the consumables usage unit 151 makes a judgment as to whether the requested image process is a process that uses consumables in accordance with a series of procedures shown in FIG. 2, for example. In the multifunction scanner 200, the performance of each process is controlled by the process control unit 152 in response to the judgment process of the consumables usage judgment unit 151, in accordance with a series of procedures shown in FIG. 5, for example.

Figure 5:
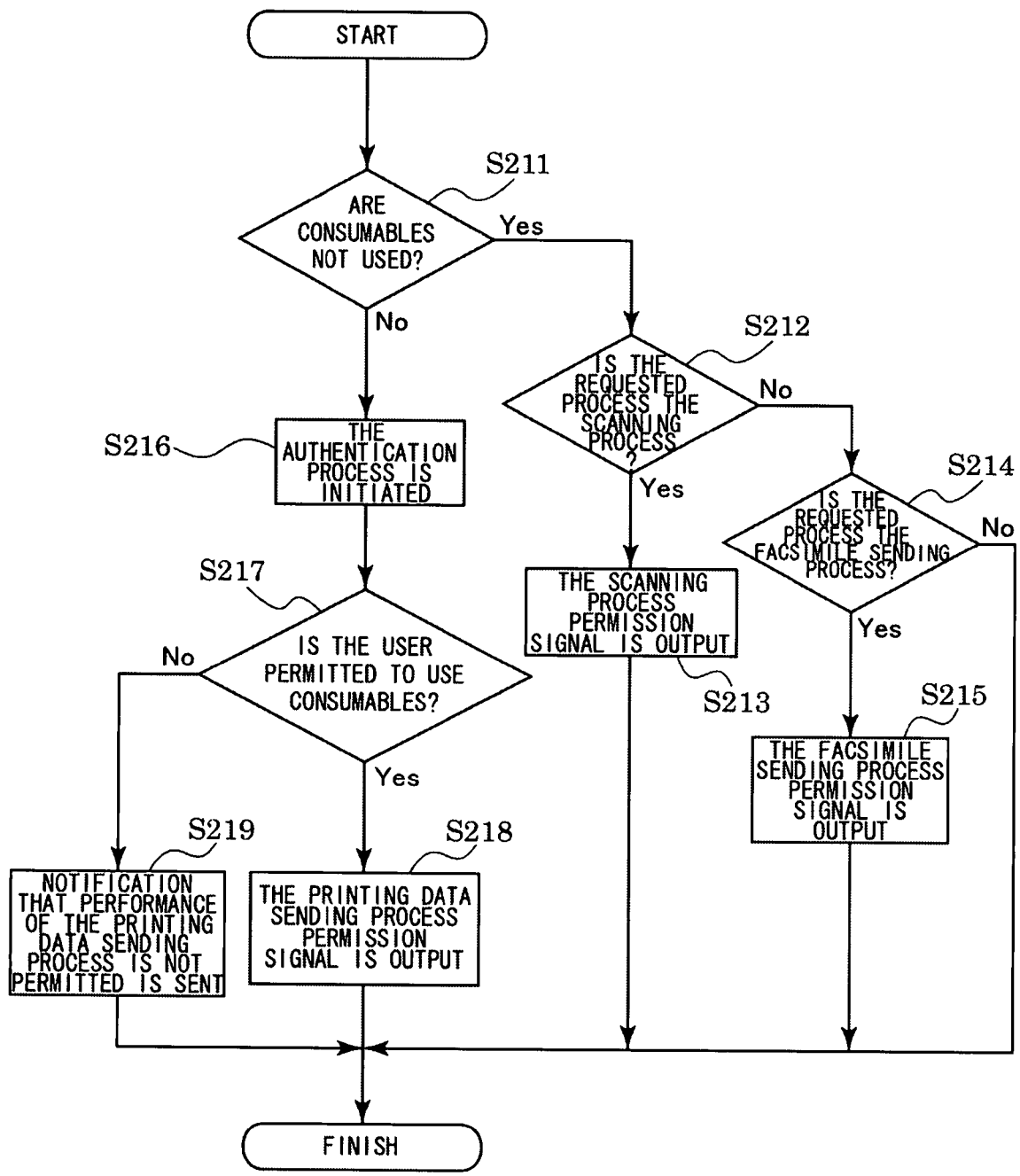
FIG. 5 is a flow chart describing a series of processes at a time when performance of each process is controlled in the multifunction scanner shown as the second embodiment of the present invention.

That is, as shown in FIG. 5 at step S211, the process control unit 152 makes a judgment as to whether the requested image process is a process that does not use consumables based on the judgment result signal $S_4$ supplied from the consumables usage judgment unit 151.

In a case where a judgment is made that the requested image process is a process that does not use consumables, the process control unit 152, at step S212, makes a judgment as to whether the requested image process is the scanning process based on the process type signal $S_5$ supplied from the consumables usage judgment unit 151. In a case where a judgment is made that the requested image process is the scanning process, the process control unit 152, at step S213, supplies the scanning process permission signal $S_6$ permitting performance of the scanning process to the scanned image process unit 112 of the image scanning process unit 110. The series of processes is then finished. In response to the aforementioned process, the image scanning process unit 110 performs the scanning process of the image and outputs the scanned data to the personal computer 170.

In a case where a judgment is made at step S212 that the requested image process is not the scanning process, the process control unit 152, at step S214, makes a judgment as to whether the requested image process is the facsimile sending process based on the process type signal $S_5$ supplied from the consumables usage judgment unit 151. In a case where a judgment is made that the requested image process is the facsimile sending process, the process control unit 152, at step S215, supplies the facsimile sending process permission signal $S_8$ permitting performance of the facsimile sending process to the facsimile sending process unit 130. The series of processes is then finished. In response to the aforementioned process, the facsimile sending process unit 130 performs the facsimile sending process of the image, outputs the facsimile data to the public circuit 180 via the secondary interface unit (circuit I/F) 142, and sends the facsimile data to the facsimile machine of the recipient.

On the other hand, in a case where the process control unit 152 makes a judgment at step S211 that the requested process is a process that uses consumables, the process moves to step S216 and the user authentication process is executed by supplying the authentication initiation signal to the authentication unit 154, and the process control unit 152 sends a notification message to the user via the operation panel 155 prompting the user to input the authentication information. In a case where the process control unit 152 makes a judgment at step S217 that the user is permitted to use consumables based on the authentication result signal supplied from the authentication unit 154, the process unit 152 then, at step S218, supplies the printing process permission signal $S_7$ permitting performance of the printing process or the copying process to the printing image processing unit 211 of the image forming process unit 210. The series of processes is then finished. In response to the aforementioned process, the image forming process unit 210 performs the printing process or copying process of the image, thereby creating the printed material. In a case where the process control unit 152 makes a judgment at step S217 that the user is not permitted to use consumables based on the authentication result signal supplied from the authentication unit 154, the process unit 152 then, at step S219, sends a notification message via the operation panel 155 stating that the user is not permitted to perform the data sending process, or in other words, that the user is not permitted to perform the printing process or copying process, and does not supply the printing process permission signal $S_7$ to the image forming process unit 120. The series of processes is then finished.

In the multifunction scanner 200, the process control unit 152 can control the performance of each process, based on the judgment as to whether to perform the requested process, according to the aforementioned series of procedures.

As described above, in the multifunction scanner 200 shown as the second embodiment of the present invention, even in a case where the function to perform the printing process or copying process using the print engine is not provided so that the image is formed by the external printer 250, a judgment is made as to whether the requested image process is a process that uses consumables. In a case where the requested process uses consumables, performance of the image process is restricted. In a case where the requested process does not use consumables, performance of the image process is permitted without restriction. Therefore, a decrease in convenience of use for the user can be prevented. Furthermore, in the multifunction scanner 200, a user who is not permitted to use consumables can be reliably restricted from performing the image process that uses consumables.

[Third Embodiment]

Next, a multifunction printer, serving as an image processing apparatus shown in a third embodiment of the present invention, is described.

The multifunction printer shown as the third embodiment can perform proxy printing using another printer in a case where performance of the printing process or copying process using consumables is not permitted. Accordingly, in the description of the third embodiment, components that are the same as those described in the first embodiment are given the same number and the detailed description is omitted. The following description concerns a multifunction printer provided with a printing function and a copying function as functions for performing an image process that uses consumables, and also provided with a scanner function, a facsimiles function, and a proxy printing function using another printer as functions for performing an image process that does not use consumables.

Figure 6:
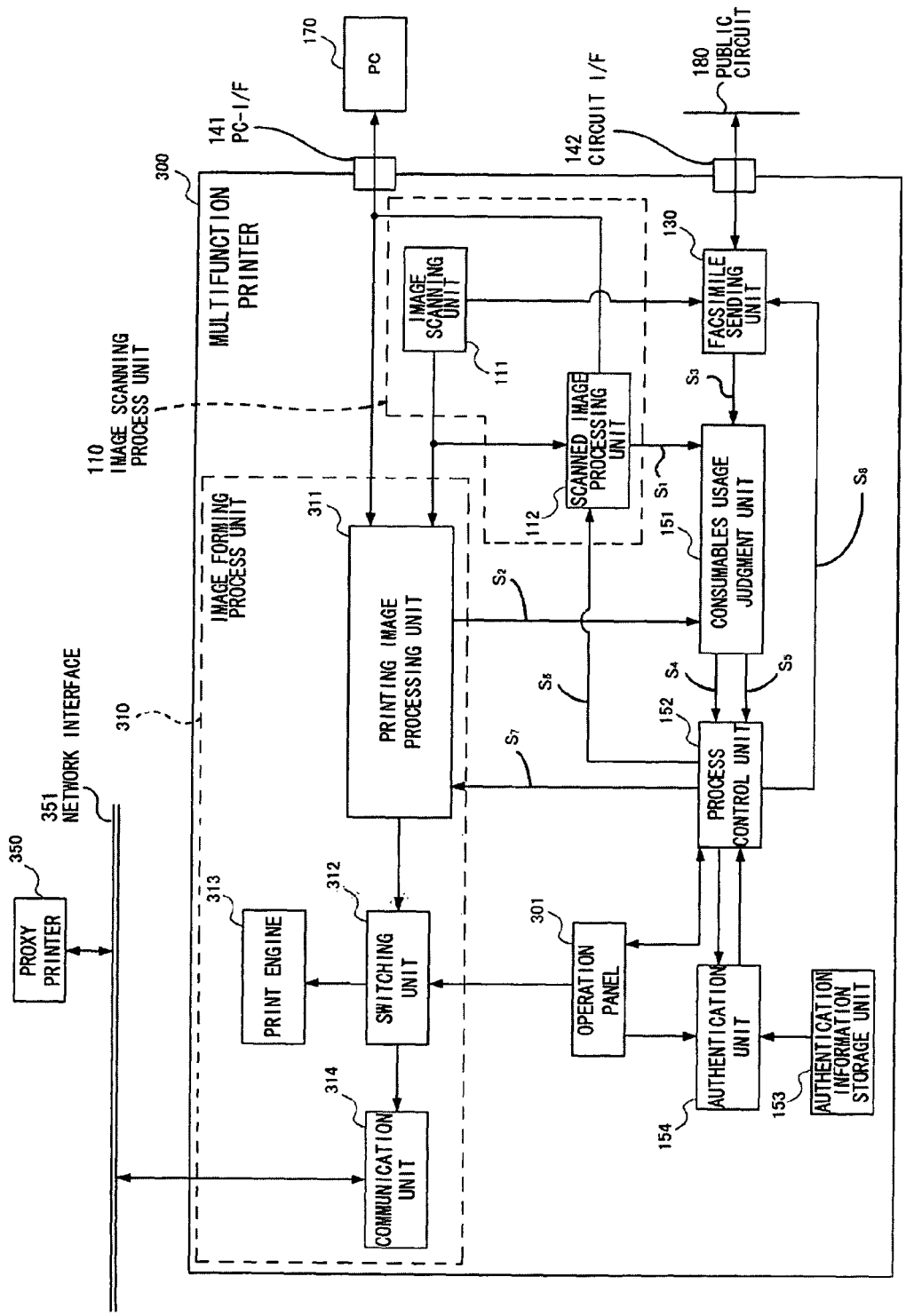
FIG. 6 is a block diagram describing a structure of a multifunction printer shown as a third embodiment of the present invention.

As shown in FIG. 6, the multifunction printer 300 is provided with an operation panel 301 in addition to the aforementioned consumables usage judgment unit 151, the process control unit 152, the authentication information storage unit 153, and the authentication unit 154.

In the same manner as the aforementioned operation panel 155, the operation panel 301 is disposed on a portion of a chassis of the multifunction printer 300 in a manner to be operable by the user. Via the operation panel 301, the user can execute various operations, such as an operation to request performance of a desired process, various setting operations, an operation to input authentication information, and the like, and can also browse messages showing a condition of the multifunction printer 300. Particularly, in a case where the user is not permitted to use consumables, the operation panel 301 displays a message prompting the user to input printer designation information for designating the proxy printer 350 and also receives the input of the printer designation information.

The multifunction printer 300 is provided with three image processing units, namely the aforementioned image scanning process unit 110 and the facsimile sending process unit 130, and an image forming process unit 310 for executing a process to form the image.

The image forming process unit 310 contains a printing image processing unit 311 for applying the image process for printing to the data sent from the personal computer 170 and to the image data scanned by the image scanning unit 111, a switching unit 312 for switching an output destination of the printing data acquired by the printing image processing unit 311, a print engine 313 for executing printing based on printing data acquired supplied from the switching unit 312, and a communication unit 314 for sending the printing data supplied from the switching unit 312 to the external proxy printer 350.

In the same manner as the aforementioned printing image processing units 121, 211, upon receiving the data sent from the personal computer 170 via the primary interface unit 141, the printing image processing unit 311 supplies a printing process initiation request signal $S_2$ requesting initiation of the printing process to the consumables usage judgment unit 151. Furthermore, even in a case where the printing image processing unit 311 receives the image data supplied from the image scanning unit 111, the printing process initiation request signal $S_2$ is supplied the consumables usage judgment unit 151. The printing image processing unit 311, under the control of the process control unit 152, applies the prescribed image process to the data sent from the personal computer 170 or the image data supplied from the image scanning unit 111 to generate the printing data, and this printing data is then supplied to the switching unit 312

The switching unit 312 switches the output destination of the printing data supplied from the printing image processing unit 311 to either the print engine 313 or the communication unit 314 based on the printer designation information input via the operation panel 301.

In the same manner as the aforementioned print engine 122, the print engine 313 uses the recording material, such as toner or ink, to execute printing on the recording medium, such as paper, based on the printing data supplied from the switching unit 312.

In the same manner as the aforementioned communication unit 212, the communication unit 314 transfers the printing data supplied from the switching unit 312 to the external proxy printer 350, serving as a proxy image forming apparatus, via a network interface 351. In the same manner as the aforementioned printer 250, the proxy printer 350 is structured as an apparatus that uses the recording material, such as toner or ink, to execute printing on the recording medium, such as paper, based on the printing data. In a case where proxy printing is executed by the proxy printer 350, consumables of the multifunction printer 300 are not used.

Such an image forming process unit 310 applies the prescribed image process to the input image data and executes printing on the recording medium based on the printing data by using the print engine 313 or by sending the printing data to the proxy printer 350. That is, the image forming process unit 310 performs the printing process or the copying process of the image as an image process that uses toner and the recording medium as consumables, and performs the printing data sending process to execute the printing process or the copying process using the proxy printer 350 as an image process that does not use toner and the recording medium of the multifunction printer 300 as consumables.

In the multifunction printer 300 provided with each of the aforementioned units, the consumables usage unit 151 makes a judgment as to whether the requested image process is a process that uses consumables in accordance with a series of procedures previously shown in FIG. 2. In the multifunction printer 300, the performance of each process is controlled by the process control unit 152 in response to the judgment process of the consumables usage judgment unit 151, in accordance with a series of procedures shown in FIG. 7, for example.

Figure 7:
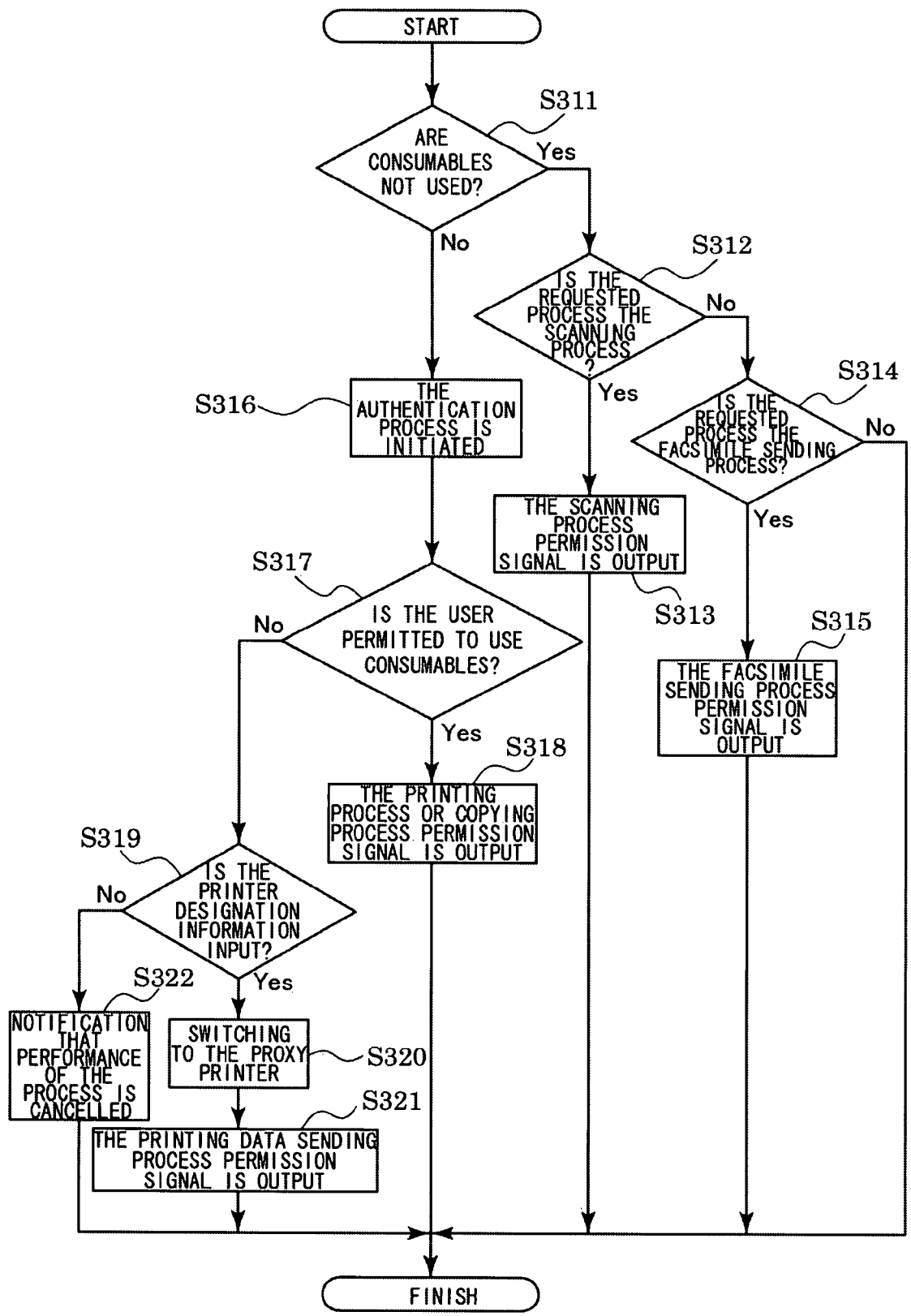
FIG. 7 is a flow chart describing a series of processes at a time when performance of each process is controlled in the multifunction printer shown as the third embodiment of the present invention.

That is, as shown in FIG. 7 at step S311, the process control unit 152 makes a judgment as to whether the requested image process is a process that does not use consumables based on the judgment result signal $S_4$ supplied from the consumables usage judgment unit 151.

In a case where a judgment is made that the requested image process is a process that does not use consumables, the process control unit 152, at step S312, makes a judgment as to whether the requested image process is the scanning process based on the process type signal $S_5$ supplied from the consumables usage judgment unit 151. In a case where a judgment is made that the requested image process is the scanning process, the process control unit 152, at step S313, supplies the scanning process permission signal $S_6$ permitting performance of the scanning process to the scanned image process unit 112 of the image scanning process unit 110. The series of processes is then finished. In response to the aforementioned process, the image scanning process unit 110 performs the scanning process of the image and outputs the scanned data to the personal computer 170.

In a case where a judgment is made at step S312 that the requested image process is not the scanning process, the process control unit 152, at step S314, makes a judgment as to whether the requested image process is the facsimile sending process based on the process type signal $S_5$ supplied from the consumables usage judgment unit 151. In a case where a judgment is made that the requested image process is the facsimile sending process, the process control unit 152, at step S315, supplies the facsimile sending process permission signal $S_8$ permitting performance of the facsimile sending process to the facsimile sending process unit 130. The series of processes is then finished. In response to the aforementioned process, the facsimile sending process unit 130 performs the facsimile sending process of the image, outputs the facsimile data to the public circuit 180 via the secondary interface unit (circuit I/F) 142, and sends the facsimile data to the facsimile machine of the recipient.

On the other hand, in a case where the process control unit 152 makes a judgment at step S311 that the requested process is a process that uses consumables, the process moves to step S316 and the user authentication process is executed by supplying the authentication initiation signal to the authentication unit 154, and the process control unit 152 sends a notification message to the user via the operation panel 301 prompting the user to input the authentication information. In a case where the process control unit 152 makes a judgment at step S317 that the user is permitted to use consumables of the multifunction printer 300 based on the authentication result signal supplied from the authentication unit 154, the process unit 152 then, at step S318, supplies the printing process permission signal $S_7$ permitting performance of the printing process or the copying process to the printing image processing unit 311 of the image forming process unit 310. The series of processes is then finished. In response to the aforementioned process, the image forming process unit 310 switches the printing data output destination to the print engine 313 using the switching unit 312, and then performs the printing process or copying process of the image using the print engine 313, thereby creating the printed material.

In a case where the process control unit 152 makes a judgment at step S317 that the user is not permitted to use consumables of the multifunction printer 300 based on the authentication result signal supplied from the authentication unit 154, the process unit 152 then, at step S319, sends a notification message via the operation panel 301 prompting the user to input the printer designation information designating the proxy printer 350 to execute proxy printing. The process control unit 152 stands by until the printer designation information is input. In a case where the printer designation information is input in the multifunction printer 300, the printer designation information is supplied from the operation panel 301 to the switching unit 312 and the process control unit 152. In response to the aforementioned process, the switching unit 312, at step S320, switches the printing data output destination to the designated proxy printer 350 based on the printer designation information. At step S321, the process control unit 152 supplies the printing process permission signal $S_7$ to the printing image processing unit 311 of the image forming process unit 310, and the series of processes is then finished. Therefore, the image forming process unit 310 generates the printing data and sends the printing data to the designated proxy printer 350, and the printed material is then created by the proxy printer 350. On the other hand, in a case where the printer designation information is not input, the process control unit 152, at step S322 cancels the proxy printing and sends message providing notification of the cancellation via the operation panel 301. The series of processes is then finished.

In the multifunction printer 300, the process control unit 152 can control the performance of each process, based on the judgment as to whether to perform the requested process, according to the aforementioned series of procedures.

As described above, in the multifunction printer 300 shown as the third embodiment of the present invention, even in a case where performance of the printing process or the copying process that use consumables is not permitted, proxy printing that does not use consumables of the multifunction printer 300 can be performed by designating another proxy printer 350 connected to a network and transferring the printing data to the proxy printer 350. Accordingly, through the multifunction printer 300, convenience of use for a user who does not can be increased.

[Fourth Embodiment]

Finally, a multifunction printer, serving as an image processing apparatus shown in a fourth embodiment of the present invention, is described The multifunction printer shown as the fourth embodiment can register in advance another printer that can be used by each user, so that in a case where performance of the printing process or the copying process that use consumables is not permitted, proxy printing can be performed using another registered printer. Accordingly, in the description of the fourth embodiment, components that are the same as those described in the third embodiment are given the same number and the detailed description is omitted. The following description concerns a multifunction printer provided with a printing function and a copying function as functions for performing an image process that uses consumables, and also provided with a scanner function, a facsimiles function, and a proxy printing function using another printer as functions for performing an image process that does not use consumables.

Figure 8:
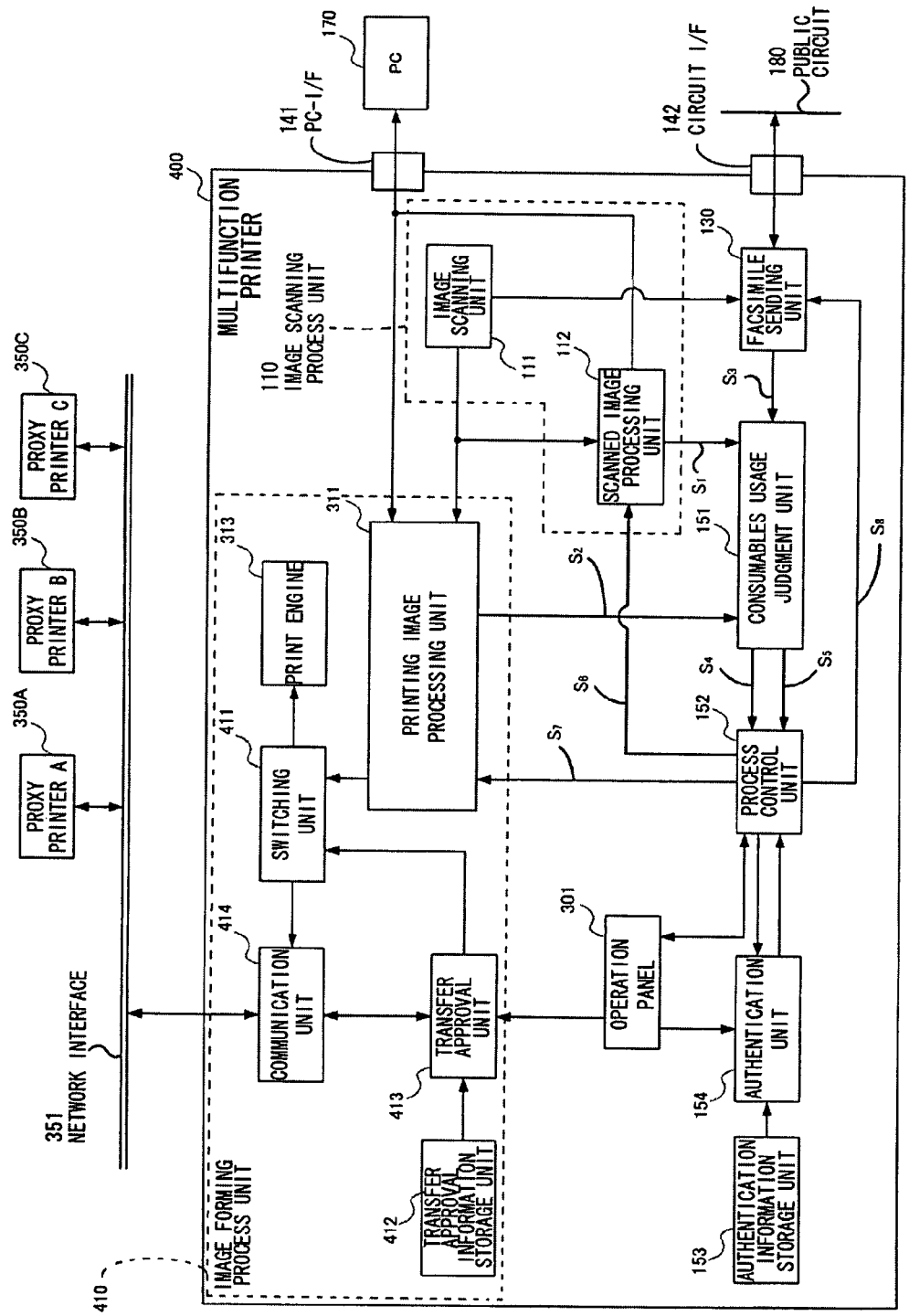
FIG. 8 is a block diagram describing a structure of a multifunction printer shown as a fourth embodiment of the present invention.

As shown in FIG. 8, the multifunction printer 400 is provided with the aforementioned consumables usage judgment unit 151, the process control unit 152, the authentication information storage unit 153, the authentication unit 154, and the control panel 301. Furthermore, the multifunction printer 400 is provided with three image processing units, namely the aforementioned image scanning process unit 110 and the facsimile sending process unit 130, and an image forming process unit 410 for executing a process to form the image.

The image forming process unit 410 contains, in addition to the aforementioned printing image processing unit 311 and print engine 313, a switching unit 411 for switching an output destination of the printing data acquired by the printing image processing unit 311, a transfer approval information storage unit 412 for storing transfer approval information which is information concerning other printers usable by each user, a transfer approval unit 413 for approving transfer of the printing data acquired by the printing image processing unit 311, and a communication unit for sending the printing data supplied from the switching unit 411 to one of an external proxy printer 350A, 350B, 350C.

The switching unit 411 switches the output destination of the printing data supplied from the printing image processing unit 311 to either the print engine 313 or the communication unit 414 based on a switching request signal supplied from the transfer approval unit 413.

The transfer approval information storage unit 412 stores the transfer approval information necessary to approve transfer at a time when the printing data generated by the printing image processing unit 311 is transferred to one of the multiple proxy printers 350A, 350B, 350C. The transfer approval information is made up of information showing a printer that can be used by each user to execute printing based on the transferred printing data, information showing whether authentication is necessary to perform printing with the printer, and authentication information in a case where authentication is necessary. Specifically, as shown in FIG. 9 for example, the transfer approval information storage unit 412 links printer identification information, such as an IP address of the proxy printer to which the printing data is sent, uniquely assigned to each proxy printer to a user ID and associated password uniquely assigned to each user capable of using the proxy printer, and stores this information as the authentication information. In FIG. 9, the user having the user ID "abc0000" can transfer printing data to the proxy printer A, and FIG. 9 shows that input of a password is unnecessary at a time of transfer. Also in FIG. 9, the user having the user ID "abc0001" can transfer printing data to the two proxy printers B, C, and FIG. 9 shows that input of a password is necessary at a time of transfer. In the same manner, as shown in FIG. 9, the user having the user ID "abc0002" can transfer printing data to the two proxy printers A, C, and FIG. 9 shows that input of a password is necessary at a time of transfer. The aforementioned transfer approval information is stored in the transfer approval information storage unit 412 by maintenance personnel of the multifunction printer 400 performing an operation via the operation panel 301. The transfer approval information stored in the transfer approval information storage unit 412 is read by the transfer approval unit 413.

The transfer approval unit 413 selects the proxy printer to which the printing data generated by the printing image processing unit 311 is transferred, based on the transfer approval information read from the transfer approval information storage unit 412 and the user information input from the operation panel 301, supplies to the communication unit 414a selection result signal showing a selection result, and supplies to the switching unit 411a switching request signal showing the condition that the output destination of the printing data is switched to the communication unit 414.

The communication unit 414, based on the selection result signal supplied from the transfer approval unit 413, transfers the printing data supplied from the switching unit 414 to one of the external proxy printers 350A, 350B, 350C, serving as a proxy image forming apparatus, via a network interface 351. In the same manner as the aforementioned printer 250, the proxy printers 350A, 350B, 350C are structured as apparatuses that uses the recording material, such as toner or ink, to execute printing on the recording medium, such as paper, based on the printing data. In a case where proxy printing is executed by one of the proxy printers 350A, 350B, 350C, consumables of the multifunction printer 400 are not used.

Such an image forming process unit 410 applies the prescribed image process to the input image data and executes printing on the recording medium based on the printing data by using the print engine 313 or by sending the printing data to one of the proxy printers 350A, 350B, 350C. That is, the image forming process unit 410 performs the printing process or the copying process of the image as an image process that uses toner and the recording medium as consumables, and performs the printing data sending process to execute the printing process or the copying process using one of the proxy printers 350A, 350B, 350C as an image process that does not use toner and the recording medium of the multifunction printer 400 as consumables.

In the multifunction printer 400 provided with each of the aforementioned units, the consumables usage unit 151 makes a judgment as to whether the requested image process is a process that uses consumables in accordance with a series of procedures previously shown in FIG. 2. In the multifunction printer 400, the performance of each process is controlled by the process control unit 152 in response to the judgment process of the consumables usage judgment unit 151, in accordance with a series of procedures shown in FIG. 10, for example.

Figure 10:
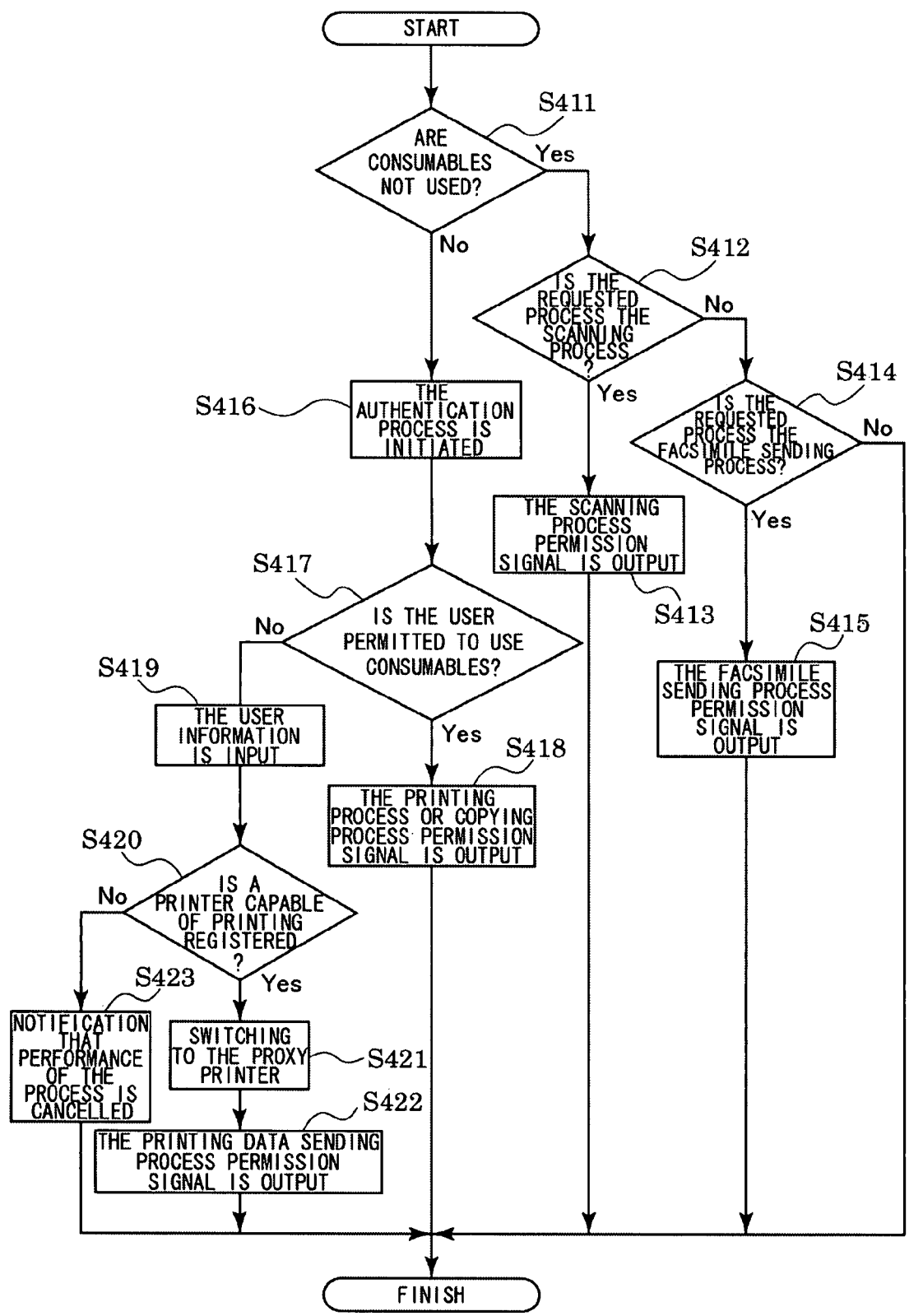
FIG. 10 is a flow chart describing a series of processes at a time when performance of each process is controlled in the multifunction printer shown as the fourth embodiment of the present invention.

That is, as shown in FIG. 10 at step S411, the process control unit 152 makes a judgment as to whether the requested image process is a process that does not use consumables based on the judgment result signal $S_4$ supplied from the consumables usage judgment unit 151.

In a case where a judgment is made that the requested image process is a process that does not use consumables, the process control unit 152, at step S412, makes a judgment as to whether the requested image process is the scanning process based on the process type signal $S_5$ supplied from the consumables usage judgment unit 151. In a case where a judgment is made that the requested image process is the scanning process, the process control unit 152, at step S413, supplies the scanning process permission signal $S_6$ permitting performance of the scanning process to the scanned image process unit 112 of the image scanning process unit 110. The series of processes is then finished. In response to the aforementioned process, the image scanning process unit 110 performs the scanning process of the image and outputs the scanned data to the personal computer 170.

In a case where a judgment is made at step S412 that the requested image process is not the scanning process, the process control unit 152, at step S414, makes a judgment as to whether the requested image process is the facsimile sending process based on the process type signal $S_5$ supplied from the consumables usage judgment unit 151. In a case where a judgment is made that the requested image process is the facsimile sending process, the process control unit 152, at step S415, supplies the facsimile sending process permission signal $S_8$ permitting performance of the facsimile sending process to the facsimile sending process unit 130. The series of processes is then finished. In response to the aforementioned process, the facsimile sending process unit 130 performs the facsimile sending process of the image, outputs the facsimile data to the public circuit 180 via the secondary interface unit (circuit I/F) 142, and sends the facsimile data to the facsimile machine of the recipient.

On the other hand, in a case where the process control unit 152 makes a judgment at step S411 that the requested process is a process that uses consumables, the process moves to step S416 and the user authentication process is executed by supplying the authentication initiation signal to the authentication unit 154, and the process control unit 152 sends a notification message to the user via the operation panel 301 prompting the user to input the authentication information. In a case where the process control unit 152 makes a judgment at step S417 that the user is permitted to use consumables of the multifunction printer 400 based on the authentication result signal supplied from the authentication unit 154, the process unit 152 then, at step S418, supplies the printing process permission signal $S_7$ permitting performance of the printing process or the copying process to the printing image processing unit 311 of the image forming process unit 410. The series of processes is then finished. In response to the aforementioned process, the image forming process unit 410 switches the printing data output destination to the print engine 313 using the switching unit 414, and then performs the printing process or copying process of the image using the print engine 313, thereby creating the printed material.

In a case where the process control unit 152 makes a judgment at step S417 that the user is not permitted to use consumables of the multifunction printer 400 based on the authentication result signal supplied from the authentication unit 154, the process unit 152 then, at step S419, sends a notification message via the operation panel 301 prompting the user, who is the person performing the printing, to input the user identification information. The user information may be the same as the previously input authentication information, and in such a case, the input may be omitted. Furthermore, rather than being input via the operation panel 301, the user information may be sent together with the data and the printing initiation command from the personal computer 170. In response to the aforementioned process, the transfer approval unit 413, at step S420, makes a judgment based on the input user information as to whether the proxy printer approved for executing proxy printing of the transferred printing data is registered in the transfer approval information storage unit 412.

In the multifunction printer 400, in a case where the proxy printer is registered, the proxy printer selection result signal is supplied from the transfer approval unit 413 to the communication unit 414 and the switching request signal, showing the condition that the output destination of the printing data is switched to the communication unit 414, is supplied to the switching unit 411. In response to the aforementioned process, the switching unit 411, at step S421, switches the output destination of the printing data to the designated proxy printer based on the switching request signal supplied from the transfer approval unit 413. Furthermore, at step S422, the control process unit 152 supplies the printing process permission signal $S_7$ permitting performance of the printing process or the copying process to the printing image processing unit 311 of the image forming process unit 410, and the series of processes is then finished. Therefore, the image forming process unit 410 generates the printing data and sends the printing data to the designated proxy printer, and the printed material is then created by the proxy printer. On the other hand, in a case where the designated printer is not registered, the process control unit 152, at step S423 cancels the proxy printing and sends message providing notification of the cancellation via the operation panel 301. The series of processes is then finished.

In the multifunction printer 400, the process control unit 152 and the transfer approval unit 413 can control the performance each process, based on the judgment as to whether to perform the requested process, according to the aforementioned series of procedures.

As described above, in the multifunction printer 400 shown as the fourth embodiment of the present invention, another printer that can be used by each user can be registered in advance, so that even in a case where performance of the printing process or the copying process that use consumables is not permitted, proxy printing can be performed, proxy printing that does not use consumables of the multifunction printer 400 can be performed by designating one of the proxy printers 350A, 350B, 350C connected to a network and sending the printing data to the designated proxy printer 350A, 350B, 350C. Accordingly, through the multifunction printer 400, convenience of use for a user who does not have permission to use consumables can be increased.

The present invention is not limited to the embodiments described above. For example, the aforementioned embodiments are described using the scanning process, the facsimile sending process, and the printing data sending process (proxy printing process) as image processes that don't use consumables, but the content of such a process used by the present invention may be anything as long as the process does not use consumables. For example, in the above embodiments, the facsimile sending process is given as an example of sending of the scanned image data, but the scanned image data may be attached to an e-mail and sent to a prescribed e-mail address. Furthermore, the aforementioned embodiments are described using the printing process and the copying process as image processes that use consumables, but the content of the process used by the present invention may be anything, such as printing of a setting report of the apparatus, for example, as long as such a process uses consumables.

The present invention can be applied to any device that executes an image process. In addition to the multifunction printer and multifunction scanner, the present invention can be suitably applied to, for example, a facsimile apparatus, a copying machine, or an apparatus provided with other composite functions.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image processing apparatus provided with multiple image processing functions, comprising:
    a first image processing section for executing a first image process that does not use consumables;
    a second image processing section for executing a second image process that uses the consumables, the second image processing section serving as an image formation process section generating printing data for forming an image on a prescribed recording medium;
    a judgment unit for making a judgment as to whether an image processing request is a first request for performing the first image process or a second request for performing the second image process;

an image process restriction section for restricting performance of the second image process by the second image processing section based on a judgment result of the judgment unit;

an authentication section for executing an authentication process of a user, the authentication section executing the authentication process of the user when the judgment unit determines that the image processing request is the second request;

a transfer approval information storage section for storing transfer approval information, which is information concerning another image forming apparatus usable by each user; and a transfer approval section for selecting the another image forming apparatus based on the transfer approval information;

wherein the image process restriction section, in a case where an authentication result by the authentication section is that the user is not permitted to use consumables of the image processing apparatus, causes the image formation process section to transfer the printing data to the another image forming apparatus selected by the transfer approval section.

2. The image processing apparatus according to claim 1, wherein the first image processing section includes an image scanning process section and a facsimile sending process section, the image scanning process section generating image data by scanning an input image, the facsimile sending process section generating facsimile data using the image data generated by the image scanning process section and sending the facsimile data.

3. The image processing apparatus according to claim 1,
wherein the first image processing section is an image scanning process section generating image data by scanning an input image, and
wherein the image formation process section generates the printing data using the image data generated by the image scanning process section.

4. The image processing apparatus according to claim 1, further comprising a receiving section for receiving data sent by a host apparatus, wherein the image formation process section generates the printing data using the data received by the receiving section.

* * * * *